M. EPSTEIN.
TANK CAR.
APPLICATION FILED MAR. 23, 1911.
1,068,750.
Patented July 29, 1913.
3 SHEETS—SHEET 1.
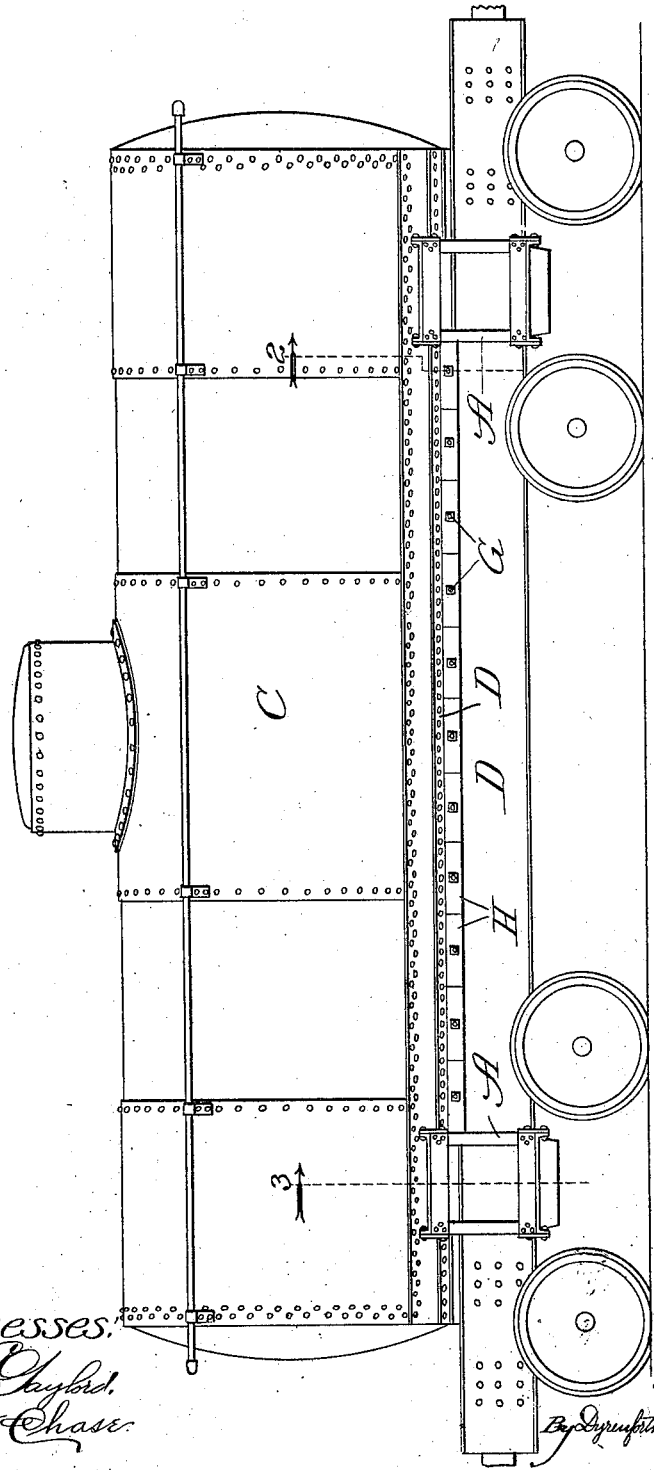

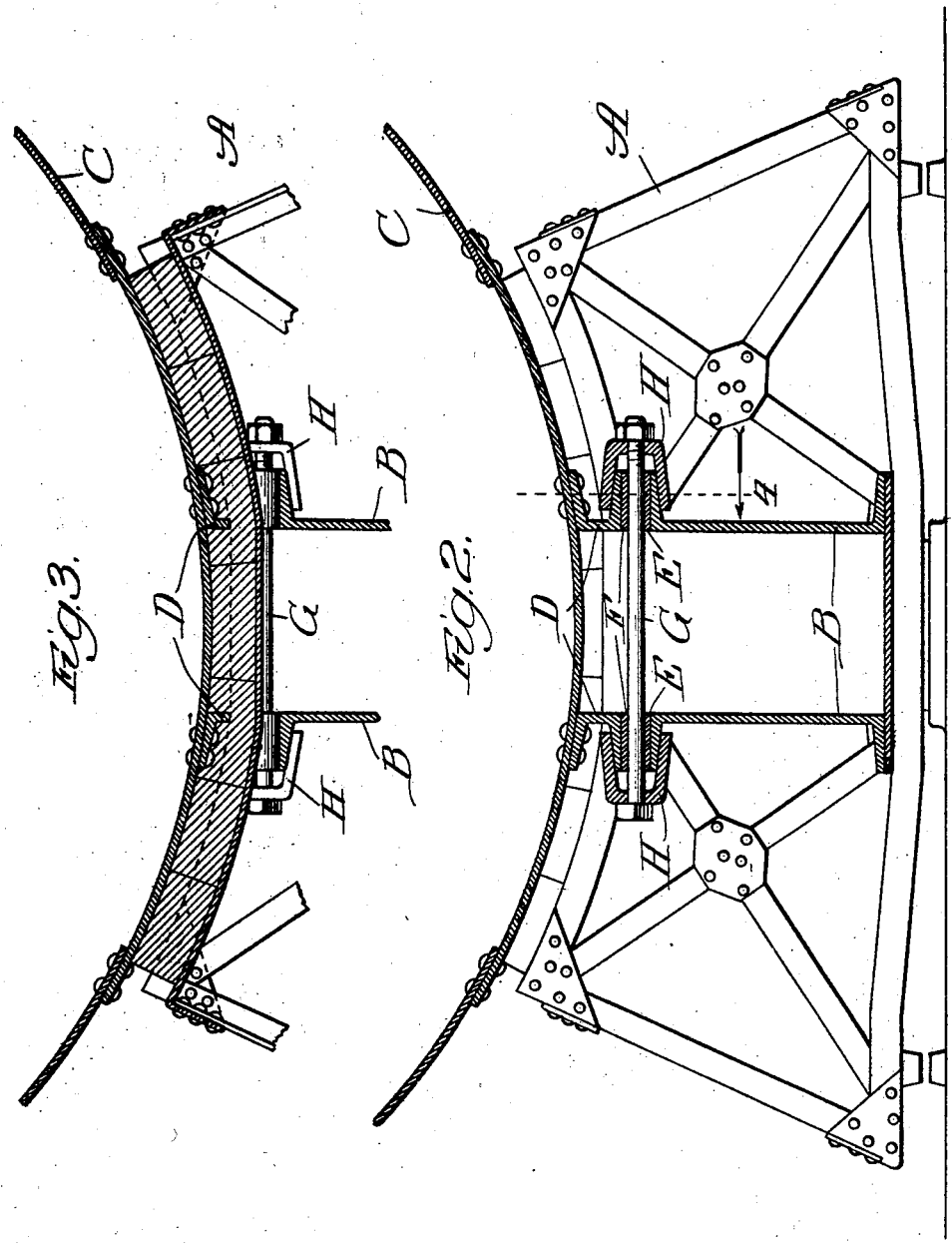

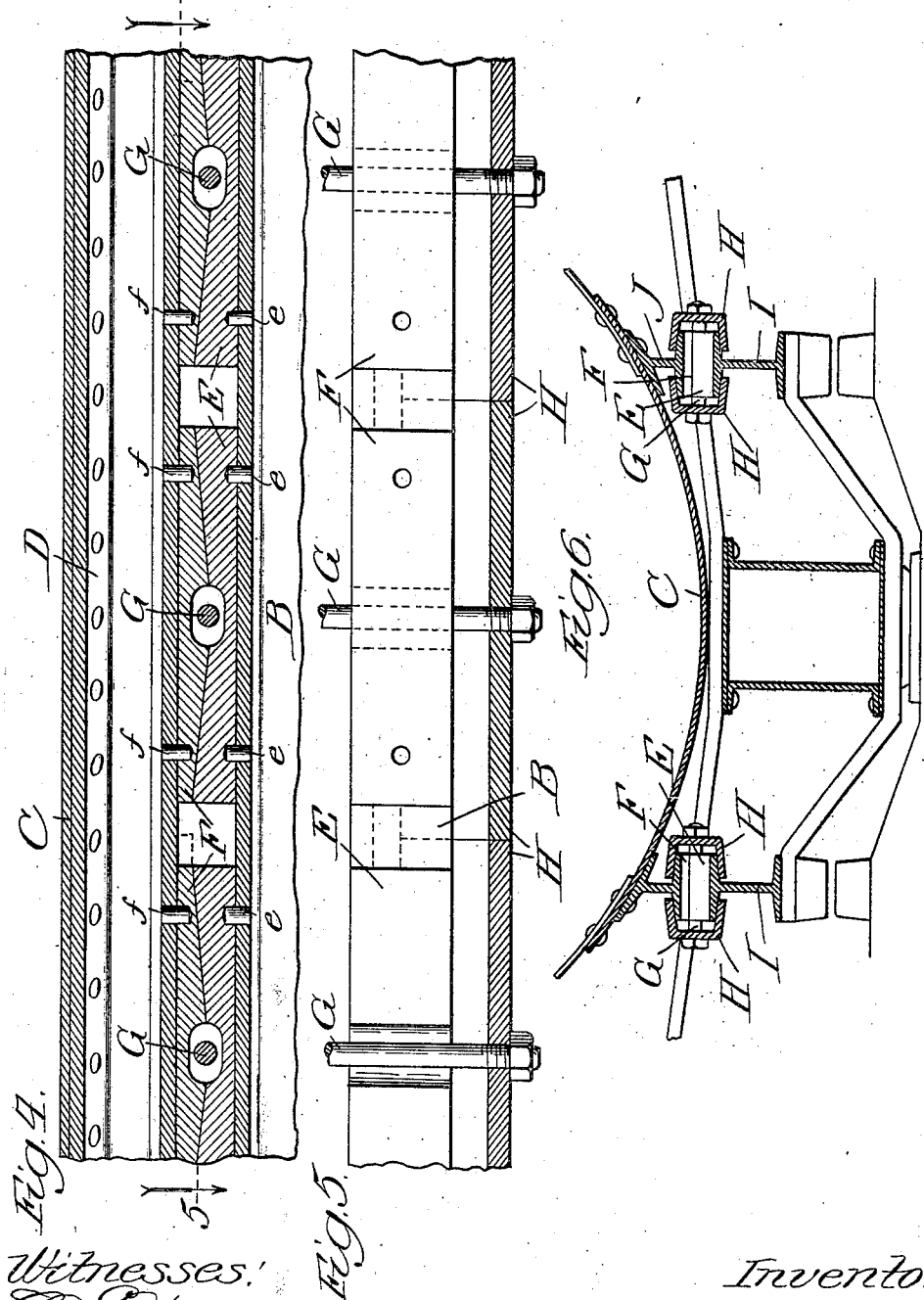

UNITED STATES PATENT OFFICE.

MAX EPSTEIN, OF CHICAGO, ILLINOIS, ASSIGNOR TO THE GERMAN AMERICAN CAR COMPANY, OF CHICAGO, ILLINOIS, A CORPORATION OF WEST VIRGINIA.

TANK-CAR.

1,068,750.  Specification of Letters Patent.  Patented July 29, 1913.

Application filed March 23, 1911. Serial No. 616,360.

*To all whom it may concern:*

Be it known that I, MAX EPSTEIN, a citizen of the United States, residing at Chicago, in the county of Cook and State of Illinois, have invented new and useful Improvements in Tank-Cars; of which the following is a specification.

My invention relates to certain new and useful improvements in a tank-car, and is fully described and explained in the specification and shown in the accompanying drawings, in which:—

Figure 1 is a side elevation of my improved car; Fig. 2 is a section in the line 2 of Fig. 1; Fig. 3 is a section in the line 3 of Fig. 1; Fig. 4 is a vertical section in the line 4 of Fig. 2; Fig. 5 is a section in the line 5 of Fig. 4, and Fig. 6 is a view similar to Fig. 2 of a modified form of construction.

In the past considerable difficulty has been experienced in connection with tank-cars, in properly securing the tank to the car-body in such a way as to secure a perfectly firm support and still not subject the tank, or any part thereof, to undue strain under operative conditions. Such strains may be caused by the momentum of the tank under sudden shocks to the car-body and more especially by tendencies to displacement caused by the movement of the fluid contents of the tank.

In devising means for attaching the tank to the body of the car, it is not only desirable that the tank be firmly attached to the body in such a manner as not to be strained under the shocks occurring in practice, but that the attachment be one which can be released without too great difficulty, so that in case of necessary repairs the tank can be lifted from the body by a crane and conveniently operated upon.

The tank-car here illustrated has many features in common with tank-cars as now ordinarily made, but it is so designed as to incorporate a novel method of attaching the tank to the car-body to secure the foregoing results.

Referring now to the drawings, A is one of the body-bolsters, the two body-bolsters carrying between them and supported by them two longitudinally-extending and outwardly-facing channel-beams B constituting center sills.

C is the tank and it will be noted that the upper portion of the body-bolster is curved so as to lie parallel to the lower surface of the tank. The upper curved beam of the body-bolster is made in the form of an outwardly-facing channel-beam which receives a plurality of wooden blocks upon which the tank rests.

The tank has riveted to its lower portions, and extending along all of that part embraced between the vertical lines of the body-bolsters, channel-beams D with their openings or channels facing outward toward the sides of the car-body. These channel-beams have the usual flat lower flanges and vertical webs, but their upper flanges are curved to conform to and fit the surface of the tank to which they are riveted in the manner illustrated.

The channel-beams D lie, when the tank is in place upon the car-body, directly above the beams B forming the center sill. Upon the flanges of the beams B rest a series of blocks E of metal, each block having two long inclined planes forming its upper surface, these running downward from its two ends toward the center so as to form a very broadly wedge-shaped depression. Upon each of the blocks E rests a conversely shaped block F, each pair of blocks E and F being centrally notched for the passage of bolts G, and the pairs of blocks E and F on the two beams B being so disposed that a single bolt can run through both pairs, as illustrated in Fig. 2. Outside of each pair of blocks is a clip H in the form of a channel, flared so as to fit over the lower flange of the corresponding beam D and under the upper flange of the corresponding beam B. These clips are centrally perforated and receive the bolts G by means of which they may be pulled tightly together. In this manner a very firm and rigid attachment is provided for the tank and yet one which will permit just enough motion to relieve the strain of expansion and contraction or any other extraordinary strain, and which connection can very quickly be disengaged to permit the tank to be removed from the car-body. The beams D attached to the tank run over a large part of the length thereof and can be so firmly riveted as to be practically a part of the tank itself. Furthermore, the beams D themselves are so strong as to make local strains to the tank impossible. The beams D and B are clamped very tightly together by means of the clips H and this arrangement alone, without the blocks E and F in their peculiar form, would probably be quite sufficient to hold the tank-body firmly in the desired position. However, these blocks E and F, which are held against longitudinal movement on their respective flanges, by dowel pins e and f fixed on the blocks respectively, engaging holes in the flanges so that the blocks cannot move relatively without exerting a tremendous wedging action upon the clips H tending to spread them. In this way, while there is a friction caused by great pressure holding the tank in its normal position, this friction is immensely increased by the very slightest movement of the tank. Thus, the tank can move slightly under great and extraordinary shock but its tendency is always, when moved into an improper position, to be immediately returned to its proper position by a very slight shock in the opposite direction.

The form of construction, as shown in Fig. 6, differs from that shown in the other drawings in the fact that the car-body is provided with side sills I, to which the tank is secured in the same manner as it is secured to the center sills in the other drawings. In Fig. 6 the side sills are shown to be of I-beams, and the tank has riveted to it I-beams J. Each pair of beams has between it the blocks E and F, which are held in place by clips exactly as in the construction of the other figures excepting, of course, that each beam J is independently locked to its own side sill, in the manner shown. This construction illustrates the adaptability of the invention to cars of the side sill-type and it may perhaps be advantageous because of the fact that the I-beams J can be riveted along the junction of the bottom plate of the tank with desirable results.

I realize that considerable variation is possible in the details of the construction, without departing from the spirit of my invention; therefore I do not intend to limit myself to the specific form herein shown and described.

I claim as new and desire to secure by Letters Patent—

1. In combination a tank, a member attached thereto and running longitudinally thereof, a longitudinal member forming part of the car-body and arranged parallel to the member on the tank, and clamp-means frictionally engaging both of said members to draw them together.

2. In combination a tank, a flanged beam extending longitudinally thereof and attached thereto, a longitudinal flanged beam forming a part of the body structure and in parallel relation to the beam on the tank, and clamp-means frictionally engaging the flanges of the two beams to draw them toward each other.

3. In combination a tank, a flanged beam extending longitudinally thereof and attached thereto, a longitudinal flanged beam forming a part of the body structure and in parallel relation to the beam on the tank, clips frictionally engaging the flanges of the beam and means for drawing the clips tight upon said flanges.

4. In combination a tank, oppositely extending flanges carried by beam means attached longitudinally to the lower part of the tank, and corresponding longitudinally extending flanges carried by beam means forming part of the car-body, channeled clips on said flanges and arranged in opposing relation, and bolts extending through the clips to draw the same together upon the oppositely extending flanges.

5. In combination a tank, oppositely extending flanges carried by beam means attached longitudinally to the lower part of the tank, and corresponding longitudinally extending flanges carried by beam means forming part of the car body, channeled clips on said flanges and arranged in opposing relation, and bolts extending through the clips to draw the same together upon the oppositely extending flanges, and blocks between the flanges.

6. In combination a tank, oppositely extending flanges carried by beam means attached longitudinally to the lower part of the tank, and corresponding longitudinally extending flanges carried by beam means forming part of the car-body, channeled clips on said flanges and arranged in opposing relation, and bolts extending through the clips to draw the same together upon the oppositely extending flanges, pairs of blocks between the flanges meeting in diagonal planes and means for securing each block against movement relative to the flange against which it lies.

7. In combination a tank, oppositely extending flanges carried by beam means attached longitudinally to the lower part of the tank, and corresponding longitudinally extending flanges carried by beam means forming part of the car-body, channeled clips on said flanges and arranged in opposing relation, and bolts extending through the clips to draw the same together upon the oppositely extending flanges, pairs of blocks between the flanges, one block of each pair being in the form of a broad wedge and the other having a wedge-shaped depression to receive the same, and means for securing each block against movement relative to the flange against which it lies.

8. In combination a tank, a sill having at its upper parts oppositely extending flanges, beam means attached to the tank and providing corresponding flanges, pairs of blocks between the flanges, one block of each pair being in the form of a wedge and the other having a wedge-shaped depression to receive the same, means for preventing relative movement between each block and the flange against which it lies, clips in pairs fitted over the flanges and bolts passing through each pair of clips to draw the same together.

9. In combination a center sill composed of outwardly facing channels, a tank, outwardly facing channels attached to the tank and extending longitudinally thereof in vertical alinement with the beams of the center sill, pairs of blocks between the flanges of said beams meeting in diagonal planes, clips fitted outside the flanges and bolts passing through the clips and arranged to draw the same together.

In testimony whereof I have hereunto set my hand and affixed my seal this 24th day of January, 1911.

MAX EPSTEIN. [L. S.]

In the presence of two subscribing witnesses:
J. G. ANDERSON,
R. A. SCHAEFER.